Patented Feb. 1, 1949

2,460,291

UNITED STATES PATENT OFFICE 2,460,291

PROCESS FOR PREPARATION OF TERPENE ALCOHOLS

Madison Hunt, Claymont, Del., assignor to E. I. du Pont de Nemours & Company, Wilmington, Del., a corporation of Delaware No Drawing. Application September 2, 1944, Serial No. 552,566

11 Claims. (Cl. 260—631.5)

This invention relates to the preparation of terpene alcohols.

The invention has as an object the provision of a new and improved process for the manufacture of terpene alcohols and their organic acid esters. A particular object is the preparation of geraniol and geraniol esters. Other objects will appear hereinafter.

These objects are accomplished in a process which comprises treating isoprene with an organic carboxylic acid which has an ionization constant between $1 \times 10^{-1}$ and $1 \times 10^{-4}$ and is free from ethylenic and acetylenic unsaturation on the alpha carbon i. e. free from aliphatic unsaturation conjugated with the C=O group. The reaction can be carried out in the presence or absence of substantial amounts of water.

In general the process of this invention is carried out by reacting isoprene with an organic carboxylic acid such as a chloroacetic acid, e. g., dichloroacetic acid, at a temperature between 0° and 120° C. for a period of 1–100 hours or more. In the absence of water, esters of unsaturated organic alcohols are obtained. These can be separated from the organic acid and may be purified by distillation into individual esters. The free alcohols may be obtained by saponification of these terpene esters. When a substantial amount of water is present during the reaction, the terpene alcohols may be obtained directly. In general, mixtures of the terpene alcohols and esters are formed when water is present. The ratio of alcohol to ester depends upon the acid used and the concentration, e. g., high concentrations of relatively strong acids favor the production of larger amounts of the terpene ester than would be otherwise obtained. The compounds thus obtained have the general formula $H(C_5H_8)_n OR$ in which $C_5H_8$ is derived from isoprene, R is hydrogen or an organic carboxylic acid radical and $n$ is an integer which may have a value of, e. g., from one to six. Thus when $n=1$ the alcohol that is obtained is 3-methylbutene-2-ol-1, along with its isomer 2-methylbutene-2-ol-1; when $n=2$ the alcohol is geraniol or its isomers and when $n=3$ the alcohol is farnesol or its isomers. In the reaction, higher alcohols or esters (i. e., where $n=6$ or higher) may be formed but these are usually high boiling and difficult to purify.

This invention is further illustrated by the following examples. In the first example given the terpene alcohols are obtained directly along with small amounts of ester, while the second example shows the preparation of esters which are readily converted by the use of saponification techniques into the corresponding alcohols. In these examples the parts given are parts by weight.

*Example I.*—A mixture of 15.3 parts of isoprene, 22.3 parts of water and 14.5 parts of dichloroacetic acid was sealed in a vessel under an atmosphere of nitrogen and heated at 60–65° C. for 90 hours with agitation. The reaction mixture was poured into 300 parts of water and the product separated and washed with 100 parts of a 5% aqueous solution of sodium carbonate. The product was then suspended in a mixture consisting of 40 parts of alcohol and 20 parts of water. Four parts of sodium hydroxide dissolved in 20 parts of water was added dropwise to the stirred solution at reflux temperature. The mixture was refluxed one hour after addition of the alkali and was then poured into 300 parts of water. The upper layer was separated and the water layer extracted with ether. The ether extract was dried over magnesium sulfate. After removal of the drying agent and the ether, the product was fractionally distilled. A fraction boiling at 73–74° C./1 mm. was collected. The yield of this fraction was 2.93 parts. This material consisted of geraniol and its isomers. It was predominantly geraniol since it yielded derivatives such as the 3-nitrophthalate and the diphenylurethane which were identical with those obtained from authentic geraniol.

*Example II.*—A mixture of 40 parts of isoprene and 60 parts of dichloroacetic acid was stirred at 25° C. for six hours. The reaction was exothermic and a cooling bath was employed to control the temperature. The crude reaction product was washed once with water and then suspended in a mixture of 60 parts of ethyl alcohol and 20 parts of water. This mixture was heated to 50° C. and 16 parts of sodium hydroxide dissolved in 30 parts of water was added slowly with stirring. After addition of the alkali, the mixture was refluxed for two hours. An additional four parts of sodium hydroxide in 10 parts of water was added slowly and refluxing continued for two hours. The reaction mixture was poured into 400 parts of water and the product extracted with ether. After drying over magnesium sulfate the ether was removed by evaporation. Distillation of the residue yielded the following fractions:

| | B. P., °C. | $D_4^{25}$ | $n_D^{25}$ | Yield, parts | Analysis | |
|---|---|---|---|---|---|---|
| | | | | | Cal'd. | Found |
| Fraction 1 | 47°/10 mm | 0.8677 | 1.4460 | 1.96 | For $C_5H_{10}O$—C 69.77, H 11.63 | C 68.85, H 11.45. |
| Fraction 2 | 101°/13 mm | 0.8900 | 1.4775 | 2.98 | For $C_{10}H_{18}O$—C 77.92, H 11.68 | C 77.69, H 11.77. |
| Fraction 3 | 110°–116°/1 mm | | | 2.25 | | |
| Fraction 4 | 146°–150°/1 mm | | | 1.88 | | |

Fraction 1 was 3-methylbutene-2-ol-1. It was identified by preparing the known 3-nitrophthalate which melts at 130°.

Fraction 2 consisted primarily of geraniol since solid derivatives were obtained on treatment of this fraction with reagents which form solid alcohol derivatives of geraniol, for example, a solid calcium chloride compound was readily prepared by mixing the alcohol with calcium chloride. In addition, the 3-nitrophthalate and the diphenylurethane derivatives were prepared and found to be identical with the corresponding derivatives from natural geraniol.

Fraction 3 and 4 consisted primarily of a mixture of higher alcohols of the $C_{15}$ and $C_{20}$ series.

The acids which may be used in the process of this invention are those organic carboxylic, preferably monocarboxylic, acids which have an ionization constant of between $1 \times 10^{-1}$ and $1 \times 10^{-4}$ and are free from ethylenic and acetylenic unsaturation on the alpha carbon. Saturated aliphatic acids are particularly useful. These acids include alpha-bromopropionic, bromoacetic, monochloroacetic, dichloroacetic, formic, salicylic, etc. halogen substituted fatty acids, i. e., of the acetic acid series and particularly haloacetic acids, having ionization constants in the proper range are preferred. The amount of acid that is used may vary within wide limits, for example, between 1 and 500 parts of acid per 100 parts of isoprene may be used. The amount of water which can be employed can also vary within wide limits, for example, from between 0 and about 500 parts per 100 parts of isoprene may be used. In general, the use of water is preferred since the terpene alcohols can be directly obtained and are usually obtained in somewhat higher yields than by conversion from the esters.

The process may also be carried out in the presence of inert organic solvents, e. g., benzene.

The process of this invention is limited to the use of organic carboxylic acids since it has been found that organic acids such as para-toluenesulfonic acid give terpene derivatives which are neither alcohols nor esters and sulfuric acid (British Patent 338,152) gives resinous materials. The organic carboxylic acids of this invention are of advantage in that they give a higher yield of product from which the pure compounds can be more readily separated and obtained in higher yield than when the sulfuric acid-acetic acid mixtures employed in the method described in the prior art are used. The latter method gives only very small yields of geraniol.

The temperature for this reaction is preferably between about 0° C. and 100° C. When temperatures of higher than about 35° C. are employed, pressure resistant containers are necessary for the reaction since the operation is carried out above the boiling point of isoprene. In general, in the use of temperatures of above 35° C. it is preferred that water be present in the reaction.

The time required for the reaction of isoprene in the presence of the organic acids is not critical and is usually of the order of 5–100 hours although shorter or longer times may be employed. Furthermore, when water is employed to give the terpene alcohols, the time for the reaction may be much longer than when the reaction is carried out in the absence of substantial amounts of water.

The products obtained by the process of this invention, i. e., compounds of the formula $$H(C_5H_8)_nOR$$

where R is hydrogen or an organic carboxylic acid radical as previously defined and where $n$ is an integer, for example, from 1–6, are useful in the preparation of perfumes, flavors, and for similar applications. The terpene alcohols (where R=H in the above formula) are also useful as starting materials for the synthesis of various terpene-like organic materials.

The above description and examples are intended to be illustrative only. Any modification thereof or variation therefrom which conforms to the spirit of the invention is intended to be included within the scope of the claims.

What is claimed is:

1. A process for the preparation of terpene alcohols having a plurality of $C_5H_8$ units in the molecule which comprises treating isoprene at 25° C. for six hours with one and one-half times its weight of dichloroacetic acid.

2. A process which comprises treating isoprene with from 1 to 500%, by weight thereof, of dichloroacetic acid at a temperature of 0–100° C. for 5–100 hours and separating from the reaction mixture polymerization-hydration products having a plurality of $C_5H_8$ units in the molecule.

3. A process which comprises treating isoprene with dichloroacetic acid at 0–100° C. for 5–100 hours and separating from the reaction mixture polymerization-hydration products having a plurality of $C_5H_8$ units in the molecule.

4. A process which comprises treating isoprene with a halogenoacetic acid of ionization constant of $1 \times 10^{-1}$ to $1 \times 10^{-4}$, for 5–100 hours at 0–100° C. and separating from the reaction mixture polymerization-hydration products having a plurality of $C_5H_8$ units in the molecule.

5. A process according to claim 1 wherein up to 500% of water, based on the weight of isoprene, is present.

6. Process according to claim 1 conducted in the presence of an organic solvent.

7. Process according to claim 1 conducted in the presence of water and an inert organic solvent.

8. A process which comprises treating isoprene with an organic monocarboxylic acid of ionization constant of from $1 \times 10^{-1}$ to $1 \times 10^{-4}$ which acid is free from ethylenic and acetylenic unsaturation on the alpha carbon and separating from the reaction mixture polymerization-hydration products having a plurality of $C_5H_8$ units in the molecule.

9. Process according to claim 2 wherein an inert, organic solvent and water, in amount up to 500% of the weight of the isoprene, are present.

10. Process according to claim 4 wherein an inert, organic solvent and water, in amount up to 500% of the weight of the isoprene, are present.

11. In the process for the preparation of terpene alcohols having a plurality of $C_5H_8$ units in the molecule, the steps comprising the treatment of isoprene at 25° C. for six hours with one and one-half times its weight of dichloroacetic acid, thereby forming esters of terpene alcohols, and subsequently hydrolyzing the ester formed.

MADISON HUNT.

REFERENCES CITED

The following references are of record in the file of this patent:

UNITED STATES PATENTS

| Number | Name | Date |
|---|---|---|
| 726,783 | Thurlow | Apr. 28, 1903 |
| 986,038 | Austerweil | Mar. 7, 1911 |
| 1,784,165 | Tavaka | Dec. 9, 1930 |

FOREIGN PATENTS

| Number | Country | Date |
|---|---|---|
| 252,160 | Germany | Oct. 15, 1912 |
| 338,152 | Great Britain | Nov. 14, 1930 |

OTHER REFERENCES

Wagner, Jauregg, Annalen 496, pages 52–77 (1932).

Lennartz, Ber. 76, 831–846 (1943).

Chemical Abst., 36 col. 3798 (1942); abstracting an article of Archarya in Jour. Univ. Bombay, 10 Pt. 3, pages 101–17 (1941).